Feb. 9, 1971    J. L. FRITCH    3,561,090
VALVE CORE CHANGING TOOL
Filed Nov. 22, 1968
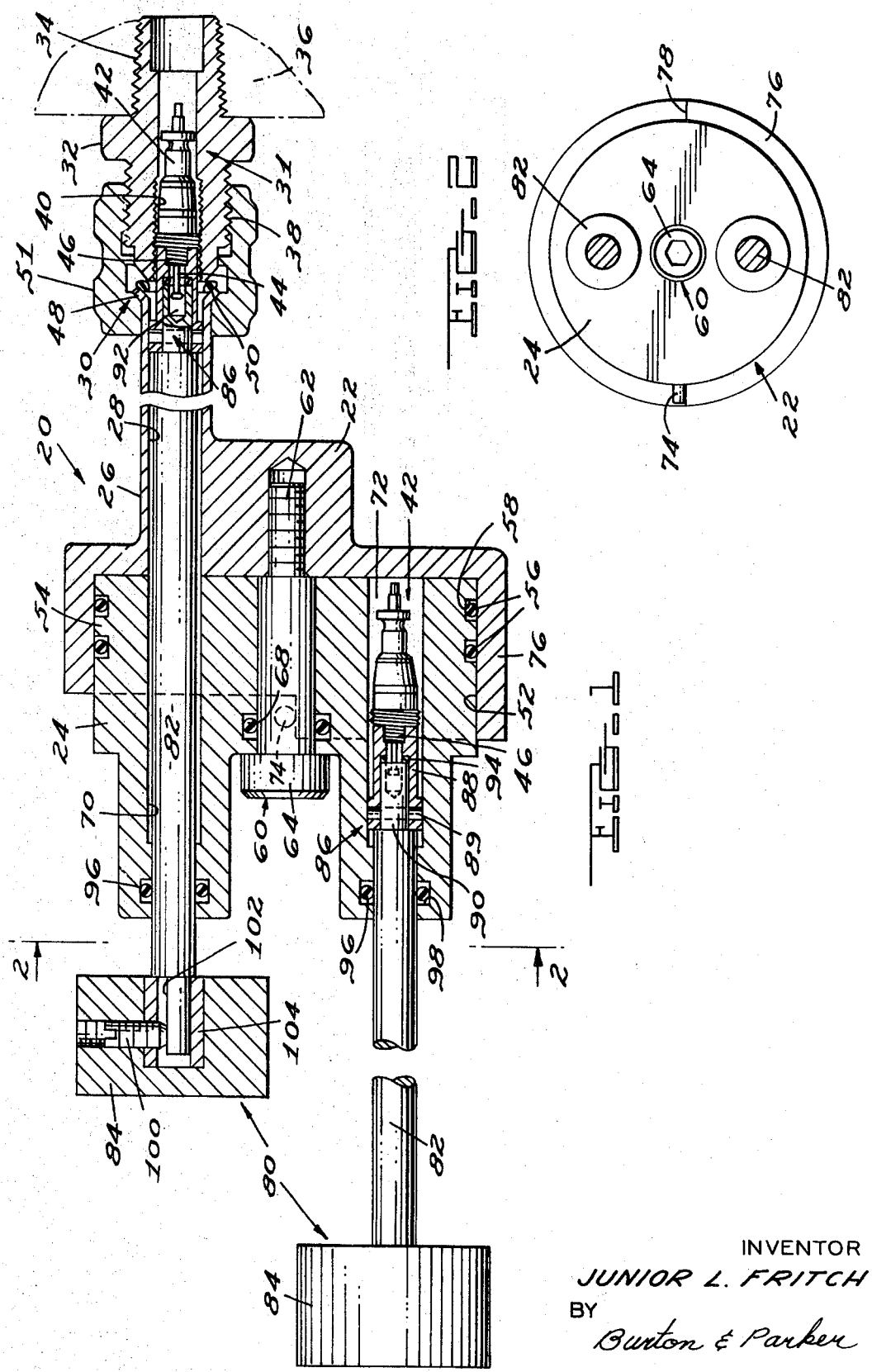
INVENTOR
JUNIOR L. FRITCH
BY
Burton & Parker
ATTORNEYS

United States Patent Office 3,561,090
Patented Feb. 9, 1971

3,561,090
VALVE CORE CHANGING TOOL
Junior L. Fritch, Edgerton, Ohio, assignor to Robinair Manufacturing Corporation, Montpelier, Ohio, a corporation of Ohio
Filed Nov. 22, 1968, Ser. No. 778,282
Int. Cl. B23p 19/04
U.S. Cl. 29—213                10 Claims

ABSTRACT OF THE DISCLOSURE

A pressure tight valve core changing tool, adapted to remove and replace a valve core without loss of pressure through the valve body. The valve core changing tool disclosed herein includes a first body member having a passage providing sealed communication with the valve, and a relatively rotatable body member having two sealed valve core receiving chambers, which may be alternatively indexed to communicate with the passage. A grappling means is provided within each of the chambers which may be manipulated through the first body member passage to remove and releasably retain the core of the valve. The valve core is then retracted to within the chamber, and the second body member is rotated, relative to the first body member, to align the other chamber with the passage. The grappling means is then extended to replace the valve core, without loss of pressure through the valve.

DESCRIPTION OF THE PRIOR ART

Many pressurized or vacuum systems, including automotive air conditioning systems, presently utilize valves having a replaceable core member, such as a Schrader valve or "tire" valve. The core of the valve may however be defective, damaged, or otherwise require replacement, and the need therefore exists for a tool which can replace the valve core, without loss of pressure in the system. The alternative is to reduce the pressure in the system to the pressure of the environment, which generally requires completely draining the system.

A pressure system charging tool, having a similar grappling means, is disclosed in United States Letters Patent 3,299,648. The charging tool disclosed in this patent has already provided may advantages in the automotive refrigeration field, however the tool of this invention is intended for an entirely different purpose. The charging tool disclosed in the referenced patent is not capable of removing a damaged or defective valve core and replacing it with a new valve core, without loss of pressure through the valve, and is not intended for this purpose.

SUMMARY OF THE INVENTION

The invention disclosed herein relates to a pressure tight valve core removing tool adapted to remove and replace a valve core, or the like, without loss of pressure through the valve body. The tool of this invention is particularly, although not exclusively, adapted to remove and replace a valve core in a valve body having a threaded port which threadedly receives the core, such as a Schrader valve or "tire" valve. The stem of the Schrader valve core, for example, is depressed during use, and may thereby be damaged. It would therefore be desirable to replace the valve core in situ.

The valve core changing tool of this invention includes a first body member having a sealed passage open at one end for sealed communication with the opening in the valve body, or port, and is adapted to receive the valve core therethrough. A second body member is secured to the first body member, and rotatable relative thereto, about an axis substantially parallel to, but spaced from the passage in the first body member. The second body member has two sealed elongated valve core receiving chambers, each substantially parallel to the axis of rotation of the second member, but spaced therefrom a distance equal to approximately the distance the passage in the first body member is spaced from the axis of rotation. The valve core receiving chambers are therefore positioned to alternatively provide sealed communication between the passage in the first body member and one of the chambers, when the second body member is indexed into alignment.

A grappling means is provided within each of the chambers, which may be manipulated by an external knob, or the like. Each grappling means includes an elongated stem portion axially shiftable and rotatable in one of the second body member chambers, terminating in a grappling portion adapted to be received in the passage in the first body member, and engage and releasably retain the core of the valve. The grappling portion of one of the grappling means may thus be extended through the passage to remove the core from a valve receiving the tool of this invention. The valve core is then retracted by retracting the grappling means to within the communicating sealed chamber. The body member is then rotated to align the other sealed chamber with the passage in the first body member, and a valve core received therein may be extended and replaced in the valve body.

In the disclosed embodiment of the valve core changing tool of this invention, the first body member includes a generally cup-shaped recess which sealingly receives the second body member therein. The recess is preferably cylindrical, and the portion of the second body member received within said recess is therefore also cylindrical, and rotatable about its axis. In this embodiment, the second body member chambers are spaced 180 degrees apart, and the second body member is provided with a radially projecting stop means which permits rotation of the second body member 180 degrees in one direction, and prevents rotation in the opposite direction. The first body member passage is thus easily and accurately aligned with one of the chambers in the second body member.

The first body member in the disclosed embodiment includes a projecting portion including the passage, and a threaded nut adapted to threadedly receive the threaded projecting end of the valve body. In this embodiment, the threaded nut is rotatably received on the end of the projecting portion of the first body member, to permit threaded receipt of the valve body, without rotation of the tool.

Other advantages, and meritorious features will more fully appear from the following description, claims and accompanying drawings, wherein:

FIG. 1 is a partially cross sectioned side view of the tool of this invention, received on a valve body; and
FIG. 2 is an end, cross sectional view of the embodiment shown in FIG. 1, in the direction of view arrows 2—2.

DESCRIPTION OF THE PREFERRED EMBODIMENT

The valve core changing tool 20 shown in the drawings includes a first body member 22, and a relatively rotatable second body member 24. The first body member includes a projecting tubular portion 26, which includes a passage 28 open at one end 30 for sealed communication with the valve body 32. The valve 31 illustrated in FIG. 1 is a conventional Schrader valve utilized in many pressure and vacuum systems, including automotive refrigeration systems.

This embodiment of the valve includes a tapered threaded end 34 which is received in the bulkhead of the pressure or vacuum vessel, shown in phantom at 36, and an opposed externally threaded end 38 which normally receives a pressure or vacuum line, not shown. The internally threaded port 40 threadedly receives the valve core 42, which it is the object of the tool of this invention to remove and replace. The Shrader valve core includes a spring tensioned stem 44, which is normally depressed to allow passage of fluid or vapor through the valve. The threaded end of the valve core 42 includes a rectangular shoulder 46 to permit threading and unthreading of the valve core in the port 40.

In this embodiment of the tool of this invention, the forward end 48 of the tubular projecting portion 26 is flared, and an O-ring 50 is provided between the flared end 48 and the projecting end of the valve body to provide sealed communication between the passage 28 in the first body member and the port 40 in the valve body. The internally threaded nut or swivel coupling 51 is adapted to be threadedly received on the valve body, and compress the O-ring 50 against the valve body. The coupling is rotatably received on the tubular projecting portion 26 of the first body member to permit threading without rotation of the tool, and the external surface may be knurled to aid in threading the coupling on the valve body.

A generally cylindrical cup-shaped recess 52 is provided in the rearward end of the first body member 22, which rotatably receives the cylindrical forward end 54 of the second body member 24. A pair of O-rings 56 are provided in annular grooves 58, defined in the forward end 62 of the bolt si threadedly secured in the first body member within the cup-shaped recess 52. A shoulder bolt 60 rotatably secures the second body member 24 within the recess 52 in the first body member 22, and serves as the axis of rotation for the second body member. One end of the bolt is threadably secured in the first body member, and the head portion 64 of the bolt retains the second body member in the recess. An O-ring 68 may be provided to seal the shoulder bolt within the aperture in the second body member.

The second body member 24 is provided with two elongated sealed chambers, 70 and 72, whose axes are generally parallel to the axis of rotation of the second body member, but are spaced therefrom approximately the same distance the passage 28 is spaced from the axis. Either of the chambers may thus be aligned with the passage 28 in the first body member by indexing the second body member about its axis. A radially extending stop 74, best shown in FIG. 2, is provided on the second body member, which engages a 180 degree flange 76 on the first body member, to permit rotation of the second body member 180 degrees in one direction and prevent rotation in the opposite direction. The sealed chambers 70 and 72 are also spaced 180 degrees about the axis of rotation, and are positioned relative to the stop 74 and flange 76 to accurately coaxially align one of the chambers, 70 or 72, with the passage 28 when the stop engages either edge 78 of the projecting flange 76.

The grappling members, indicated generally at 80, include an elongated stem portion 82 which is received through the rearward wall of the sealed chambers, an external manipulating knob or handle 84, and a grappling portion 86 disposed within the chamber. This embodiment of the grappling portion includes a bifurcated grappling head 88, which is secured to the stem portion by a roll pin 89. The bifurcated ends of the head 88 firmly grip the rectangular shoulder 46 of the valve core 42, and the reduced diameter end 90 of the stem portion has an aperture 92 which receives the valve stem 44, as shown in FIG. 1. In this embodiment, an O-ring 94 is provided between the end 90 of the stem portion and the head 88 of the grappling portion to releasably retain the stem 44 of the valve core, as the grappling portion is shifted axially within the chamber. Further details of the disclosed embodiment of the grappling means, and other embodiments, may be found in the above referenced United States Letters Patent.

In this embodiment of the invention, an O-ring 96 is provided within an annular recess 98 in the rearward portion of the second body member, which engages the stem portion 82 of the grappling member, and seals the opening in the rearward wall of the chamber. The knob 84 is secured to the end of the stem portion by a set screw 100, which engages a flat 102 on the end of the stem portion. A metal sleeve 104 may be provided within the knob, to aid in the retention.

A valve core is removed and replaced by the tool of this invention by first disposing the replacement valve core within one of the chambers 70 or 72 in the second body member. This is done by extending the grappling portion 86 of one of the grappling members through the open end 30 of the passage 28, and disposing the stem portion 44 of the replacement core into the aperture 92 in the end of the grappling portion. The O-ring 94 will prevent accidental removal of the valve core as the grappling member is shifted axially. The valve core is then retracted, by rearward movement of the knob 84, to within the valve core chamber, and the second body member 24 is rotated to align the empty chamber with the passage 28.

The valve core changing tool shown in FIG. 1 has a replacement valve core disposed in chamber 72, and chamber 70 has been indexed into alignment with the passage 28. The internally threaded nut, or swivel coupling 51 is then threadedly received on the threaded projecting end of the valve body 32 to provide sealed communication between the port 40 of the valve and the passage 28 in the tool.

The grappling portion 86, is then extended to engage the valve core 42 in the valve body 32, as shown in FIG. 1. It may be necessary to rotate the grappling portion slightly, by manipulation of the knob 84, to seat the bifurcated end 88 of the grappling portion on the rectangular shoulder 46 of the core. The grappling portion is then rotated, by rotating the knob 84, to unthread the core from the valve body port 40, and the core is retracted to within the second body member chamber 70. The O-ring 94 will retain the valve core in the grappling portion. The second body member may now be rotated, in the opposite direction, to align the chamber 72 with the passage 28, and the replacement valve core extended and threaded into the port of the valve body by manipulation of the knob 84. It should be noted that the stop 74 prevents rotation of the second body member beyond the alignment position, as described hereinabove, and aids in the alignment of the passage 28 with one of the chambers. The grappling member may then be retracted, the tool removed from the valve, and the damaged or defective valve core discarded. The valve core changing tool of this invention may thus remove and replace a defective valve core without loss of pressure through the valve.

What is claimed is:

1. A pressure tight valve core changing tool, adapted to replace a valve core without loss of pressure through the valve body, comprising: a first body member having a sealed passage open at one end for sealed communication with the opening in the valve body and adapted to receive the valve core therethrough, a second body member secured to said first body member and rotatable relative thereto about an axis substantially parallel to but spaced from said passage, said second body member having two sealed elongated valve core receiving chambers each substantially parallel to said axis of rotation, but spaced therefrom a distance equal to approximately the distance said passage is spaced from said axis, said second body member rotatable about said axis to alternately provide sealed communication between said passage and one of said chambers, a first grappling means having an elongated stem portion axially shiftable and rotatable in one of said chambers terminating a grappling portion adapted to be received in said passage to engage and releasably retain the core of the valve, and a second grappling means having an elongated stem portion axially shiftable and rotatable in the other chamber terminating in a grappling portion adapted to be alternately received in said passage to engage and releasably retain the core of the valve, such that one of said grappling portions may be extended through said passage to remove the core from a valve receiving said tool, the valve core retracted to within the sealed chamber, and the second body member rotated to permit replacement of a valve core retained in the other chamber by the grappling means.

2. The valve core changing tool defined in claim 1, characterized in that said first body member includes a projecting portion including said passage, and a threaded nut adapted to threadedly receive the threaded projecting end of the valve body, said threaded nut rotatably received on the end of said projecting portion.

3. The valve core changing tool defined in claim 1, characterized in that said elongated chambers each have an axial length longer than the axial length of the grappling portion when retaining a valve core, including the valve core.

4. The valve core changing tool defined in claim 1, characterized in that each of said grappling means includes a stem portion extending through the wall of the chamber, and an external manipulating means adapted to rotate and axially shift the grappling portion.

5. The valve core changing tool defined in claim 1, characterized in that said second body member is received within a generally cup-shaped recess defined in said first body member, sealing the chamber not in registry with said passage.

6. The valve core changing tool defined in claim 5, characterized in that a sealing means is provided within said cup-shaped recess to seal said second body member within the recess.

7. The valve core changing tool defined in claim 5, characterized in that said second body member is rotatably secured to said first body member in the axis of said second body member.

8. The valve core changing tool defined in claim 5, characterized in that the recess defined in said first body member is generally cylindrical, and the portion of said second body member received within said recess is also generally cylindrical and rotatable about its axis.

9. The valve core changing tool defined in claim 8, characterized in that said second body member chambers are spaced 180 degrees apart.

10. The valve core changing tool defined in claim 9, characterized in that said second body member is provided with a radially projecting stop means which permits rotation of said second body member 180 degrees in one direction and prevents rotation in the opposite direction.

References Cited
UNITED STATES PATENTS

| | | | |
|---|---|---|---|
| 1,736,561 | 11/1929 | Wattel | 29—240 |
| 2,771,096 | 11/1956 | Ver Nooy | 29—213X |
| 3,208,133 | 9/1965 | Morton | 29—221.5X |
| 3,299,648 | 1/1967 | White | 62—77 |

THERON E. CONDON, Primary Examiner

J. C. PETERS, Assistant Examiner

U.S. Cl. X.R.

29—221.5, 401; 62—77